No. 613,085. Patented Oct. 25, 1898.
R. H. SMITH.
ARTIFICIAL STONE.
(Application filed Mar. 24, 1898.)
(No Model.)

Witnesses
J. G. Hinkel
William E. Neff

Inventor
R. H. Smith
B. Watson & Watson
Attorneys

UNITED STATES PATENT OFFICE.

ROBERT H. SMITH, OF OBERLIN, LOUISIANA.

ARTIFICIAL STONE.

SPECIFICATION forming part of Letters Patent No. 613,085, dated October 25, 1898.

Application filed March 24, 1898. Serial No. 675,011. (No model.)

*To all whom it may concern:*

Be it known that I, ROBERT H. SMITH, a citizen of the United States, residing at Oberlin, in the parish of Calcasieu and State of Louisiana, have invented certain new and useful Improvements in the Manufacture of Artificial Stone, of which the following is a specification.

The object of my invention is the formation of artificial stones which may be used for various purposes, but which are particularly designed for tombstones.

My invention consists in the combination of certain compositions of material, the ingredients of which and their proportions by volume are hereinafter specified, in such a manner as to produce a stone having a white, hard, and smooth exterior and a body of a different material.

Figure 1:
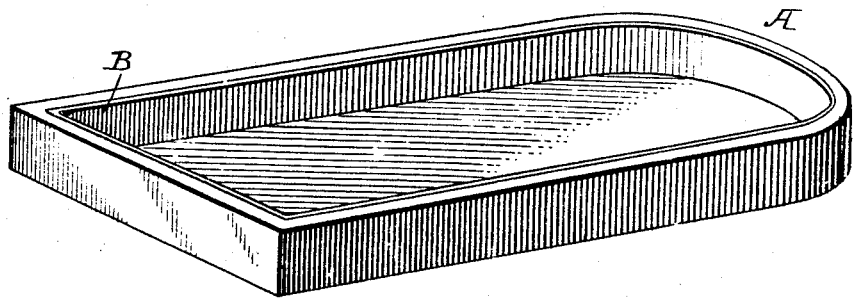

In the accompanying drawings, Figure 1 is a perspective view of a mold used in carrying out my invention. Figs. 2, 3, 4, and 5 are cross-sections through the mold, illustrating successive steps in the formation of a stone according to my process.

Figure 2:
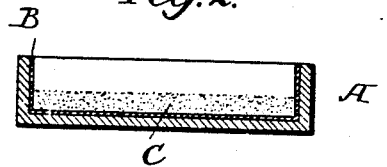
Figure 3:
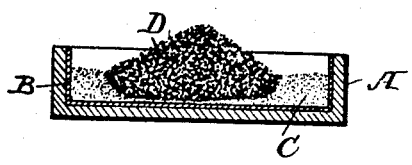
Figure 4:
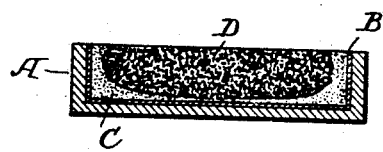
Figure 5:
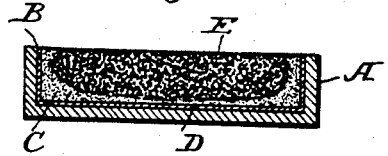

In carrying out my invention as applied to the manufacture of artificial tombstones I construct a mold A of suitable shape, formed of copper or having an interior lining B of smooth copper. I coat the walls and bottom thereof with shellac dissolved in alcohol or other solvent, and before the shellac dries the mold is laid flat and a composition C, consisting of one part lime, two parts Portland cement, two parts marble-dust, and one part plaster-of-paris, mixed with water to a pasty consistency, is poured into the mold and spread evenly on the bottom. This composition will in the case of a tombstone about one-third fill the mold, as shown in Fig. 2. I then pour into the mold along the center line and on top of the above-mentioned composition, as indicated in Fig. 3, a previously-prepared mixture D, consisting of two parts marble-dust and one part cement, with sufficient water to thoroughly wet these ingredients and form a mass which will have a somewhat thinner consistency than the composition C. The two compositions being of different consistencies will not readily run together, and the mixture D, heaped during the pouring operation upon the center of mixture C, displaces the latter and forces a part of it upward along the sides and ends of the mold. As shown in Fig. 4, the composition D will then fill the center of the mold and the composition C will surround it, except on the top, which is the face of the stone. The composition is then allowed to rest until the water which comes to the surface ceases to flow. To finish the face of the tombstone, the composition is then struck off even with the top surface of the mold by means of a smooth flat blade. Water will appear on this new surface, and after it has evaporated a dry composition of equal parts of lime and marble-dust is sifted over the surface, after which it is again struck off. Three or four applications of marble-dust and lime are thus applied, the surface being struck off after each application and the water which comes to the surface being allowed to evaporate after each operation. This leaves a face smooth and white. I then impress the lettering in the face of the stone. The materials are then allowed to dry and harden in the mold, and as they dry they unite. The outer mixture C becomes hard and white. The shellac which adheres to and becomes incorporated with its surface, together with the pressure against the smooth copper mold, gives to the outer mixture a glossy and weather-proof surface. After the stone has become thoroughly dried and bleached I apply to the surface a finishing composition E, of lime and plaster-of-paris in equal parts, mixed with water, and after this composition becomes dry it is rubbed smooth, only so much of the composition remaining as strikes into the stone. The completed stone may then be removed from the mold.

It will be evident that my invention may be carried out with different proportions of the interior and exterior mixtures and that the stones thus made may be molded into various shapes and used for a variety of purposes. For some uses the facing may be dispensed with.

Having described my invention, what I claim, and desire to secure by Letters Patent of the United States, is—

1. The process of forming artificial stone which consists in coating the interior surface of a mold with shellac, partially filling the mold with a composition consisting of one part lime, two parts cement, two parts marble-dust and one part plaster-of-paris, mixed with water, and then pouring or placing upon the middle portion of said composition a second composition consisting of two parts marble-dust and one part cement, thereby forcing a part of the first-mentioned composition upward around the second composition, substantially as described.

2. The process of forming artificial stone which consists in coating the interior surface of a mold with shellac, partially filling the mold with a composition consisting of one part lime, two parts cement, two parts marble-dust and one part plaster-of-paris, mixed with water, pouring or placing upon the middle portion of said composition a second composition consisting of two parts marble-dust and one part cement, thereby forcing a part of the first-mentioned composition upward around the second composition, then striking off the surface of both compositions and coating with equal parts sifted lime and marble-dust, allowing the mass to harden, and then applying to the upper surface a composition of equal parts lime and plaster-of-paris mixed with water, substantially as described.

3. An artificial stone consisting of a core composed of two parts marble-dust and one part cement, and an outer layer consisting of one part lime, two parts cement, two parts marble-dust and one part plaster-of-paris, substantially as described.

4. An artificial stone consisting of a core composed of two parts marble-dust and one part cement, surrounded on the back and edges by a composition consisting of one part lime, two parts cement, two parts marble-dust and one part plaster-of-paris, and faced with a finishing composition consisting of lime and plaster-of-paris, substantially as described.

In testimony whereof I affix my signature in presence of two witnesses.

ROBERT H. SMITH.

Witnesses:
  C. L. CARTER,
  A. B. GREEN.